United States Patent [19]
Ran et al.

[11] Patent Number: 5,644,361
[45] Date of Patent: Jul. 1, 1997

[54] SUBSAMPLED FRAME STORAGE TECHNIQUE FOR REDUCED MEMORY SIZE

[75] Inventors: Xiaonong Ran, Cupertino; Michael Van Scherrenburg, San Jose, both of Calif.

[73] Assignee: National Semiconductor Corporation, Santa Clara, Calif.

[21] Appl. No.: 348,272

[22] Filed: Nov. 30, 1994

[51] Int. Cl.⁶ .................................................. H04N 7/36
[52] U.S. Cl. ........................................ 348/416; 348/424
[58] Field of Search ................................ 348/392, 299, 348/408, 424, 425, 401, 409, 412, 415, 416, 413; 382/235, 236, 238

[56] References Cited

U.S. PATENT DOCUMENTS

| | | | |
|---|---|---|---|
| 4,383,272 | 5/1983 | Netravali et al. | 358/136 |
| 4,488,175 | 12/1984 | Netravali | 348/424 |
| 4,683,494 | 7/1987 | Furukawa et al. | |
| 4,689,673 | 8/1987 | Ohki et al. | |
| 4,873,573 | 10/1989 | Thomas et al. | 358/133 |
| 4,922,273 | 5/1990 | Yonekawa et al. | |
| 4,985,767 | 1/1991 | Haghiri et al. | 358/133 |
| 5,043,808 | 8/1991 | Knauer et al. | 358/133 |
| 5,097,320 | 3/1992 | Wilkinson | 358/12 |
| 5,128,759 | 7/1992 | Matsunaga | 348/424 |
| 5,144,429 | 9/1992 | Haghiri et al. | 358/138 |
| 5,151,784 | 9/1992 | Lavagetto et al. | 358/136 |
| 5,184,218 | 2/1993 | Gerdes | 358/133 |
| 5,193,003 | 3/1993 | Kondo | 348/424 |
| 5,200,820 | 4/1993 | Gharavi | 358/105 |
| 5,206,723 | 4/1993 | Parke | 358/105 |
| 5,227,878 | 7/1993 | Puri et al. | 358/136 |
| 5,329,318 | 7/1994 | Keith | 348/699 |

FOREIGN PATENT DOCUMENTS

| | | |
|---|---|---|
| 0535272A1 | 10/1991 | European Pat. Off. |
| 0527446A2 | 8/1992 | European Pat. Off. |
| 0527446A3 | 8/1992 | European Pat. Off. |
| 0 527 446 | 2/1993 | European Pat. Off. |
| 0 535 272 | 4/1993 | European Pat. Off. |
| 0570127A2 | 4/1993 | European Pat. Off. |
| 0570127A3 | 4/1993 | European Pat. Off. |
| 0596423A2 | 10/1993 | European Pat. Off. |
| 0596423A3 | 10/1993 | European Pat. Off. |
| 0 570 127 | 11/1993 | European Pat. Off. |
| 0 596 423 | 5/1994 | European Pat. Off. |
| 2094891 | 4/1990 | Japan. |
| 02 094891 | 6/1990 | Japan. |
| 4104681 | 4/1992 | Japan. |
| 04 104681 | 7/1992 | Japan. |

OTHER PUBLICATIONS

H. G. Musmann, P. Pirsch and H.-J. Grallert, "Advances in Picture Coding," Proceedings of the IEEE, vol. 73, pp. 523–548, Apr. 1985.

(List continued on next page.)

*Primary Examiner*—Amelia Au
*Attorney, Agent, or Firm*—Skjerven, Morrill, MacPherson, Franklin & Friel; Brian D. Ogonowsky

[57] ABSTRACT

A video compression system in accordance with the present invention may use a frame buffer which is only a fraction of the size of a full frame buffer. A subsampler connected to an input of the frame buffer performs 4 to 1 subsampling on the video data to be stored in the frame buffer. This allows the frame buffer to be one-fourth the size of a full frame buffer. The subsampling may even be 9 to 1, 16 to 1, or another ratio, for a concomitant decrease in frame buffer size. An upsampler is connected to the output of the frame buffer for providing interpolated and filtered values between the subsamples. Novel methods of filtering and interpolating performed by the upsampler are described. A new motion estimation technique is also described herein which directly detects the number of bits required to be transmitted to convey the difference between the predicted video data and the current video data, where a fewer number of bits used to convey the difference corresponds to better motion estimation. The search criterion for the best estimate of movement of a block is the minimum number of bits for conveying this difference.

13 Claims, 8 Drawing Sheets

OTHER PUBLICATIONS

R. J. Moorhead II, S. A. Rajala and L. W. Cook, "Image Sequence Compression Using a Pel–Recursive Motion–Compensated Technique," IEEE J. on Selected Areas in Commun., vol. SAC–5, pp. 1100–1114, Aug. 1987.

D. R. Walker and K. R. Rao, "Improved Pel–Recursive Motion Compensation," IEEE Trans. Commun., vol. COM–32, pp. 1128–1134, Oct. 1984.

A. N. Netravali and J. D. Robbins, "Motion–Compensated Television Coding: Part I," B.S.T.J., vol. 58, 631–670, Mar. 1979.

S. Kappagantula and K. R. Rao, "Motion Compensation Interframe Image Prediction," IEEE Trans. Commun., vol. COM–33, pp. 1011–1015, Sep. 1985.

SUBSAMPLED FRAME STORAGE TECHNIQUE FOR REDUCED MEMORY SIZE

FIELD OF THE INVENTION

This invention relates to the compression of video signals, and more particularly to a method for reducing the required size of a frame buffer used in a video compression system.

BACKGROUND OF THE INVENTION

Video signals for transmission typically originate from video cameras. The bandwidth of these non-compressed video signals is substantial and, consequently, numerous attempts have been made to reduce the bandwidth of the signals for transmission without unduly degrading the images. Typically, to reduce bandwidth, the frames of video signals are encoded, and redundancies in consecutive frames of the encoded signals are extracted and deleted. Only the differences between consecutive frames are then transmitted. Various techniques are used in the art depending on the particular application. One of the techniques for further reducing the bandwidth of moving images is generally referred to as motion compensated predictive coding.

FIG. 1 illustrates one type of conventional video coder which utilizes motion compensation. Video signals in digital form are received at input 10. It will be assumed for FIG. 1 that the video data applied to input 10 is in a well known block format wherein blocks of 8×8 picture elements (pels) in an image are sequentially applied to input 10. The pels in a block are applied to input 10 in a raster scan type sequence.

A subtractor 12 outputs the difference between the current video signal and a predicted video signal from a predictor 14. Predictor 14 includes a first frame buffer containing the full reconstructed previous frame of video data. This frame buffer is relatively large and expensive since it must typically store at least 352×288 pels. If each pel requires 8 bits to encode, then the frame buffer must store about 811K bits. A 1 Mbit buffer is typically used.

Thus, the difference between the current video frame applied to input 10 and the predicted video frame outputted from predictor 14 is outputted from subtractor 12. The difference signals for an entire block are then transformed by a processor/quantizer 18 to generate transform coefficients using, for example, discrete-cosine transformation, and the coefficients are then quantized. The quantized coefficients are then encoded by a coder 20 to be in a conventional variable-length type code for additional compression of the video signal. The resulting difference signal is then outputted at output 21 for transmission to a receiver.

Motion estimator 16 compares the current block of video data received at input 10 with the data in a search window of the previous frame (in predictor 14) to identify that region or block of the reconstructed previous frame which the current block most closely resembles. The search window (e.g., 16×16 pels) takes into account the anticipated worst-case motion of a block from one frame to another. The search window is centered at the same location in the previous frame as the current block location in the current frame. Within this search window, the pels of the current block are successively compared to other pels in a block within the search window to find a matching block. The shift of the current block which gives the best match to the corresponding block in the previous frame is deemed to be the best estimate of the displacement of the block between frames. This best estimate is usually determined based on a mean squared error (MSE) or mean absolute difference (MAD) criteria. The amount of this best estimate shift, called the motion vector, is then transmitted to the receiver/decoder.

This motion vector is also applied to the address generator controlling the addressing of the first frame buffer in predictor 14 so that the block of pels outputted by predictor 14 corresponds to the displaced block of pels applied to input 10. Thus, the pels outputted by predictor 14 are motion compensated before being compared with the incoming block of pels, thereby making the predictor 14 output a better prediction of the current frame. This results in the difference outputted by subtractor 12 being, on average, smaller, and permits the coder 20 to encode the picture using a lower bit rate than would otherwise be the case.

Motion estimator 16 may, instead of performing block-matching motion estimation, use a well-known pel recursive technique, which generates motion vectors to minimize the prediction error at each pel. This is more computationally intensive than the block-matching technique.

After the motion vector and coded difference signal are transmitted, the receiver then updates the previous frame (already stored at the receiver) using the transmitted motion vector and difference signal. The frame buffer at the receiver must store the full frame, causing this frame buffer to be large and expensive.

The difference signal outputted by processor/quantizer 18 is also fed back to a second frame buffer in either predictor 14 or motion estimator 16 through an inverse processor/quantizer 22 and adder 24. The output of adder 24 is the motion compensated predicted frame in the first frame buffer plus the difference signal. Thus, the second frame buffer in predictor 14 or motion estimator 16 now stores essentially the current frame of the video image (identical to that stored at the receiver), while the first frame buffer still stores the previous frame. This second frame buffer, like the first frame buffer, stores a full frame of pels and is consequently large and expensive.

For the next frame applied to input 10, the functions of the second frame buffer (now storing the previous frame) and the first frame buffer are reversed, so that the second frame buffer outputs blocks of pels to subtractor 12. The above-described block-matching process is then repeated for the next frame.

If a determination is made that the pels of the block have not changed as compared with the previous frame (which is usually the case), a signal is transmitted which signifies to the receiver/decoder that it needs to merely repeat the pels of that block from the previous frame to obtain the pels for the current block.

The above-described video compression system is relatively large and expensive due to the complex circuitry needed to calculate the best estimate block shift and due to the need for large frame buffers capable of storing an entire frame. What is needed is a video compression system which is less expensive, smaller, and simpler than conventional video compression systems.

SUMMARY

A video compression system in accordance with the present invention uses a frame buffer which is only a fraction of the size of a full frame buffer. A subsampler connected to an input of the frame buffer performs 4 to 1 subsampling on the video data to be stored in the frame buffer. This allows the frame buffer to be one-fourth the size of a full frame buffer. The subsampling may even be 9 to 1, 16 to 1, or another ratio, for a concomitant decrease in frame buffer size.

An upsampler is connected to the output of the frame buffer for providing interpolated values between the subsamples. Novel methods of filtering and interpolating performed by the upsampler are described.

A new motion estimation technique is also described herein which directly detects the number of bits required to be transmitted to convey the difference between the predicted video data and the current video data, where a fewer number of bits used to convey the difference corresponds to better motion estimation. The search criterion for the best estimate of movement of a block is the minimum number of bits for conveying this difference instead of minimizing the mean squared error (MSE) or mean average difference (MAD). Thus, complex calculations involving MSD or MAD are avoided. This further reduces the size of the video compression system.

DETAILED DESCRIPTION OF THE PREFERRED EMBODIMENTS

Figure 1:
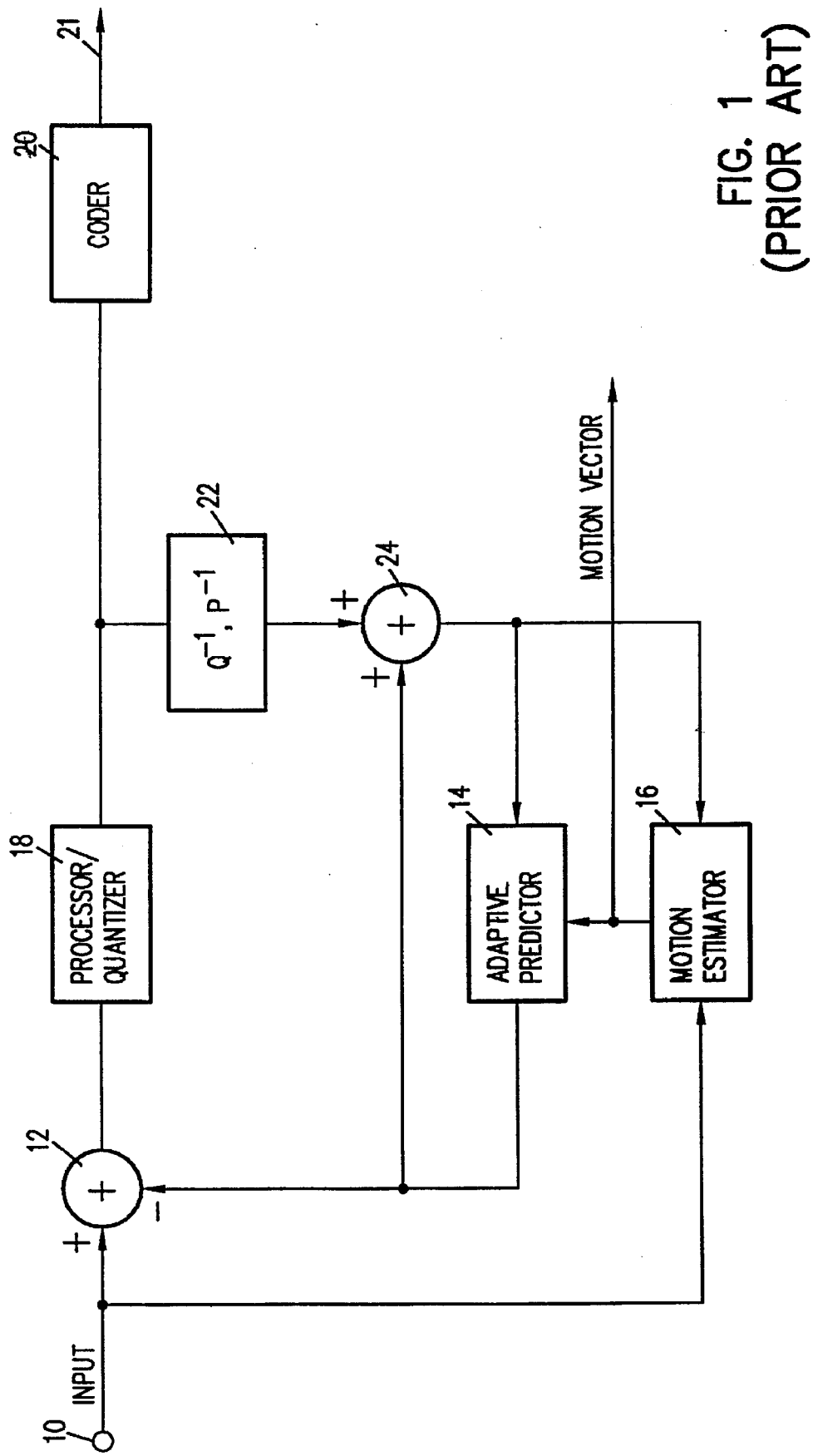
FIG. 1 is a block diagram of a prior art video coding system with motion compensation.
Figure 2:
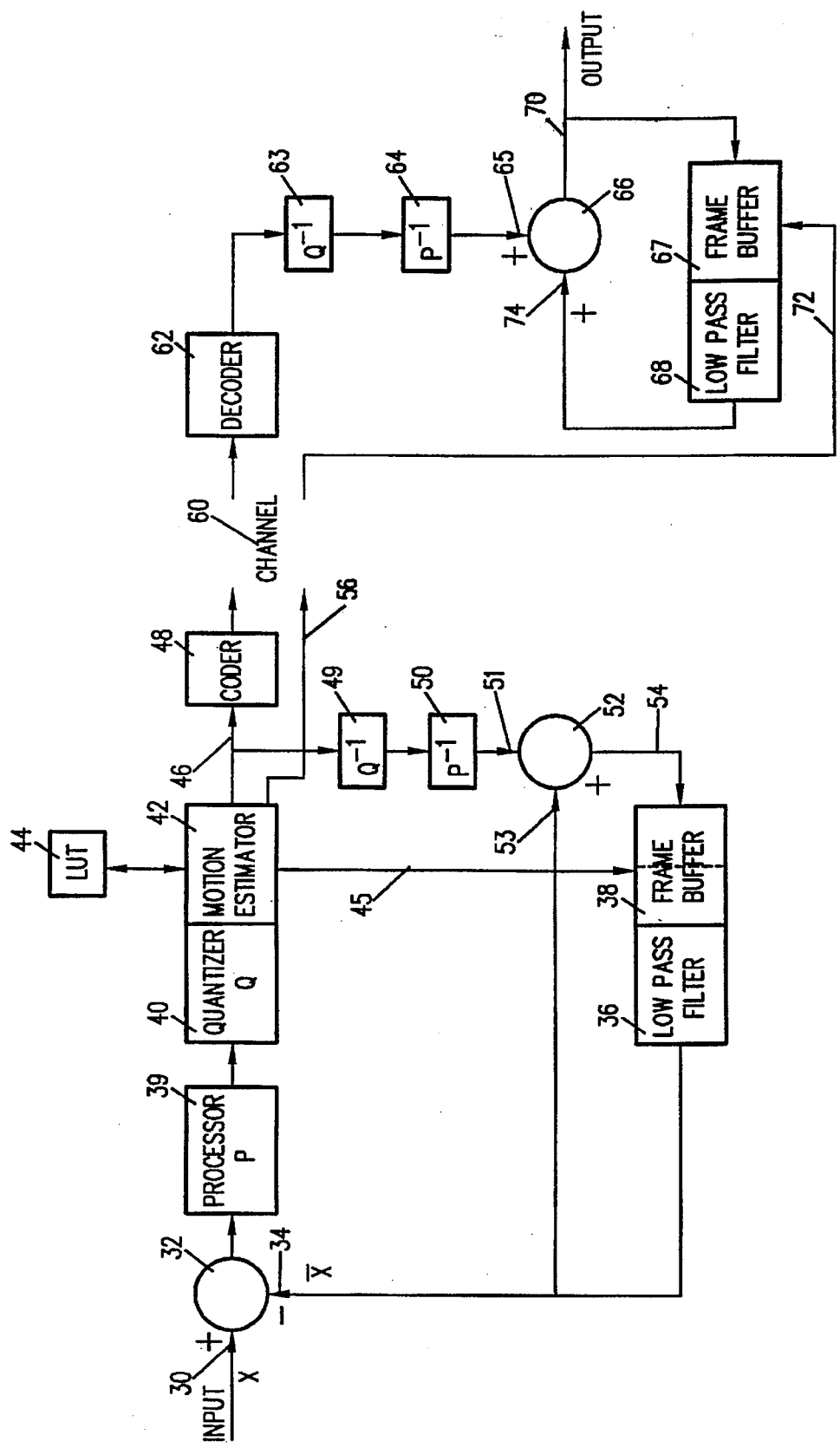
FIG. 2 is a block diagram of a reduced size video coding/decoding system with motion estimation.
Figure 3:
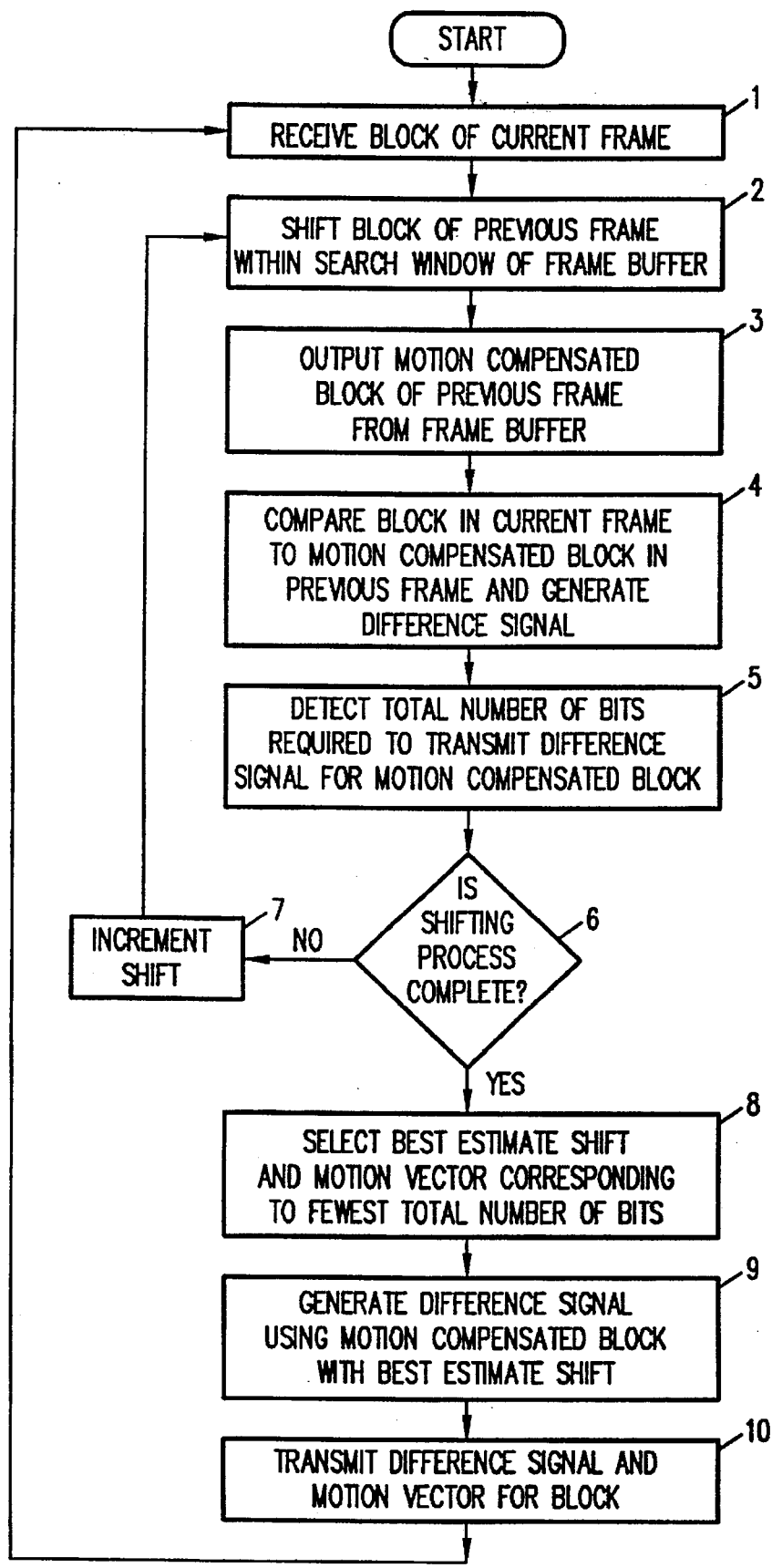
FIG. 3 is a flow chart describing the basic steps performed by the structure of FIG. 2 for carrying out one embodiment of the motion estimation process.

One embodiment of a video coding/decoding (codec) system is shown in FIG. 2. A flow chart of the basic steps used in the motion estimation process is shown in FIG. 3.

In FIG. 2, digital video data is applied to input 30 of subtractor 32 in a block format. (Step 1 of FIG. 3.) A suitable block organizer buffer (not shown) organizes the input frame into non-overlapping M×N size blocks of the pel data. One block may be 4×4 pels, 8×8 pels, 16×16 pels, or 32×32 pels, depending on the requirements of the system. Digital signals representing each sequential pel of a block are then applied to input 30 in a well known manner.

A second input 34 of subtractor 32 is connected to an output of an optional low pass filter 36, which suppresses high frequency noise. The low pass filter 36 filters the output of a conventional frame buffer 38 which sequentially outputs bytes representing addressed pels in the video frame stored in frame buffer 38.

The output of subtractor 32 is applied to a processor 39 which receives the difference signal for each pel in the block. The processor 39 then performs a transform on the difference signals in the block to generate coefficients (e.g., frequency coefficients) representing the difference signals for the block. This transform may be a well known discrete cosine transform or other suitable transform. One other possible transform coding technique is described in U.S. application Ser. No. 08/153,931, entitled "Quadtree-Structured Walsh Transform Coding," incorporated herein by reference.

Transform coding is a conventional and well known method used to reduce the bandwidth of video signals, and the best coding method would be based on the particular requirements for cost, complexity, and the tolerable signal-to-noise ratio of the recovered signals.

Quantizer 40 then quantizes the coefficients to reduce the number of levels. Such a quantizer 40 is conventional and well known.

A motion estimator 42 is connected to an output of quantizer 40. Motion estimator 42 is also connected to an address generator for frame buffer 38 via line 45 to cause frame buffer 38 to output a block of pels which has been shifted or motion compensated for input into subtractor 32. If the initial output of quantizer 40 indicates that no significant displacement of the block has taken place between frames, then the transmitted motion vector will be zero, and coder 48 will encode and transmit to the receiver the output of quantizer 40. If motion has taken place, then motion estimator 42 attempts to motion compensate the output of frame buffer 38 to best match the outputted block to the current block being supplied at input 30. The block difference at the output of subtractor 32 of the current block and the best matching block output from filter 36 will be processed by processor 39, quantized by quantizer 40, and then input to coder 48. The bits output by coder 48 along with the code for the best estimate motion vector will be transmitted to the receiver through an appropriate channel 60.

Other techniques may be used to cause frame buffer 38 to output a motion compensated block of pels.

Motion estimator 42 addresses a look-up table 44 using the quantized coefficients. The look-up table 44 cross-references each quantized value with the number of bits required to be transmitted to convey that quantized value and then outputs that number to the motion estimator 42. The motion estimator 42 then adds up the total number of bits required to transmit the difference signals for the block. This total number of bits represents the extent of the error between the block of the current frame and the motion compensated output of frame buffer 38.

Motion estimator 42 can use conventional block-matching search schemes to repeatedly shift (or motion compensate) the block of pels within a search window outputted by frame buffer 38. (Steps 2 and 3 in FIG. 3.) For each shift of the block outputted by frame buffer 38 (which stores the previous frame), the block is compared with a block in the current video frame and this difference is processed by processor 39 and quantized by quantizer 40. (Step 4 in FIG. 3.) At each iteration, the look-up table 44 in conjunction with the motion estimator 42 determine the total number of bits necessary to transmit this difference. (Step 5 in FIG. 3.)

At the end of the search scheme, which may be a well known full search of a search window or a well known three-step search, the shift that required the fewest number of bits to be transmitted is chosen as the best estimate shift. (Steps 6, 7 and 8 of FIG. 3.)

Thus, instead of calculating mean square error or mean absolute difference at each iteration to determine the error between the motion compensated block and the current block applied to input 30, the number of bits required to be outputted by the video coder is used as the best estimate search criterion.

In one type of searching scheme, the iterative process is stopped when the current quantized difference (as measured by the number of bits required to convey the difference) is not smaller than the difference from the previous step. In another search scheme, various block displacements are first performed, and the displacement resulting in the smallest difference is then selected as the best estimate.

In one embodiment, the total number of bits, as determined by the outputs of the look-up table 44, may be used by the motion estimator 42 in adaptively modifying the search strategy performed by the motion estimator 42, such as would be the procedure using a 3-step process. Such a 3-step process is described by Musmann et al. in the article "Advances in Picture Coding," Proceedings of the IEEE, Vol. 73, pp. 523–548, April, 1985. Other searches may use a logarithmetic 2D search, such as described by Musmann et al. The book "Digital Pictures," by Natravali et al., Plenum Press, 1988, describes additional search techniques.

The chosen best estimate shift is then applied to the address generator for frame buffer 38 via line 45, and the outputted motion compensated block is compared to the corresponding block in the current frame at input 30. (Step 9 of FIG. 3.)

The quantized output of quantizer 40 representing the resulting minimum difference signal is then outputted on line 46 into coder 48. Coder 48 changes the quantized difference into a suitable variable length code, such as a Hoffman code. This code, which will be a minimum number of bits, is then transmitted to a receiver/decoder. (Step 10 in FIG. 3.)

The stored look-up table 44 values would depend on the particular quantizer 40 and coder 48 used.

The quantized difference signal applied to coder 48 for transmission is also applied to an input of an inverse quantizer 49. The output of inverse quantizer 49 is then applied to the input of an inverse processor 50, which performs an inverse transform on the difference signals. The output of inverse processor 50 is applied to an input 51 of adder 52 which has another input 53 connected to the output of filter 36. The output of adder 52 on line 54 is connected to an input of frame buffer 38. This output of adder 52 will thus be the motion compensated block from the previous frame, as corrected by the difference signal, corresponding to the current block. In one embodiment, this motion compensated block is then stored in a second frame buffer within frame buffer 38 so that the second frame buffer will eventually store the current frame.

The first frame buffer in frame buffer 38 continues to be used as the source of motion compensated blocks from the previous frame for application to subtractor 32. For the next frame to be applied to input 30, the functions of the first frame buffer and second frame buffer are reversed, using a multiplexer, so that the second frame buffer now supplies the motion compensated blocks of the previous frame to subtractor 32.

Other ways to store a current frame in frame buffer 38 may also be used. Such methods may simply update portions of a single frame buffer with motion compensated data once those portions of the frame buffer have already been addressed for providing a motion compensated block to subtractor 32. This would avoid the need for two frame buffers. Such techniques are well known in the art.

A motion vector, corresponding to the best estimate shift, is outputted by motion estimator 42 on line 56 for transmission to a receiver. This motion vector is the same vector which minimized the number of bits outputted by coder 48.

The receiver/decoder is also show in FIG. 2. The difference signal outputted by coder 48 is transmitted over channel 60 and decoded by a suitable decoder 62. The decoded difference signal is then applied to an inverse quantizer 63. The resulting signal is then applied to an inverse transform processor 64. The output of processor 64 is applied to an input 65 of adder 66.

The transmitted motion vector on line 56 is received on line 72 and used to displace the corresponding block of video data in frame buffer 67 (which contains a previous frame) to match the position of that block in the current frame. This motion compensated video data in frame buffer 67 is then applied to a second input 74 of adder 66, via low pass filter 68, such that the output of adder 66 on line 70 is the reconstructed motion video data. This reconstructed data is also fed back into frame buffer 67 to cause frame buffer 67 to eventually contain the current frame. This reconstructed data on line 70 may be applied to a video screen via suitable conversion circuitry.

If a determination is made by the motion estimator 42 that the pels of a block have not significantly changed as compared with the previous frame (which is usually the case), a difference signal and zero motion vector are transmitted which signifies to the receiver/decoder that it needs to merely repeat the pels of that block from the previous frame to obtain the pels for the current block. Such a determination of non-movement of a block may be that the total number of bits identified by look-up table 44 is below a threshold number.

Figure 4:
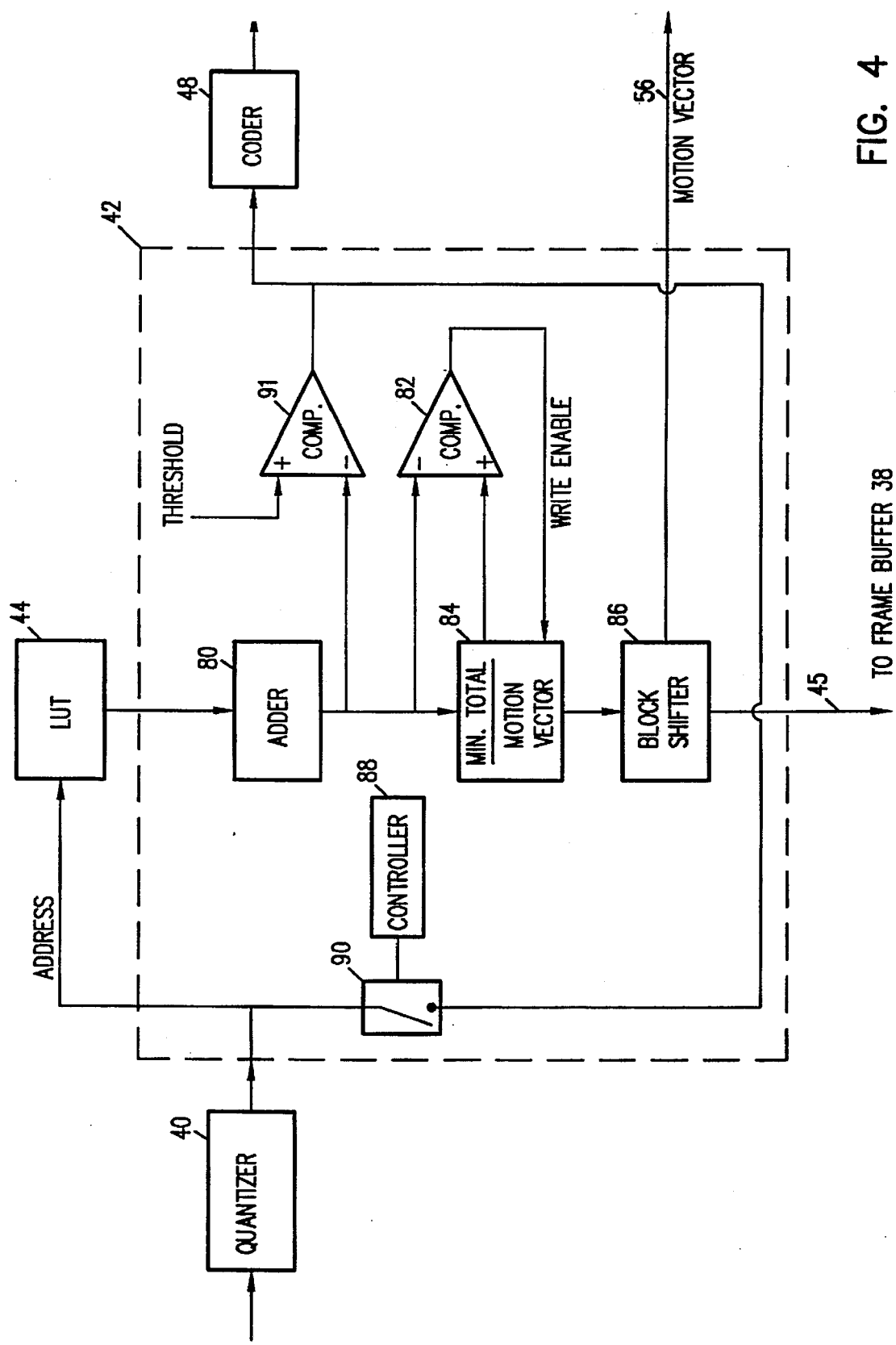
FIG. 4 illustrates the basic functional blocks of one embodiment of the motion estimator.

FIG. 4 is a simplified block diagram illustrating certain functional elements of one embodiment of the motion estimator 42. Numerous other implementations would be apparent to those skilled in the art.

The output of quantizer 40 is applied as an address to look-up table 44. Look-up table 44 outputs the number of bits corresponding to the output of quantizer 40. Adder 80 totals the number of bits representing the block of data. This total is applied to one input of a comparator 82. A memory 84 stores the smallest total count thus far outputted by adder 80 for the present block. This smallest total count is applied to a second input of comparator 82.

When comparator 82 detects a smaller count outputted by adder 80, the count and the corresponding motion vector are then stored in memory 84. The output of comparator 82 may be connected to a write enable port of the memory 84.

A conventional block shifting routine is carried out by block shifter 86, which incrementally shifts the blocks outputted by frame buffer 38 (FIG. 2). Block shifter 86 may be an ASIC. When the minimum total count and best estimate shift have been determined, the block shifter 86 causes the frame buffer 38 to output the block corresponding to that shift. A control signal generated by controller 88 closes switch 90, which connects the output of quantizer 40 to coder 48. The motion vector corresponding to the best estimate shift is outputted on line 56.

If the initial output of quantizer 40 indicates that no significant movement of the block has taken place since the last frame, a zero motion vector is transmitted and coder 48 transmits the current difference signal. In one embodiment, coder 48 is controlled to output a very low bandwidth signal to the receiver indicating such non-movement. Detecting no significant block movement may be accomplished in one embodiment by comparing the initial output of adder 80 to a threshold number, using comparator 91. If the threshold number is not exceeded, the comparator 91 controls controller 88 to close switch 90 or controls coder 48 to output a signal indicating that there has been no movement of the block.

Figure 5:
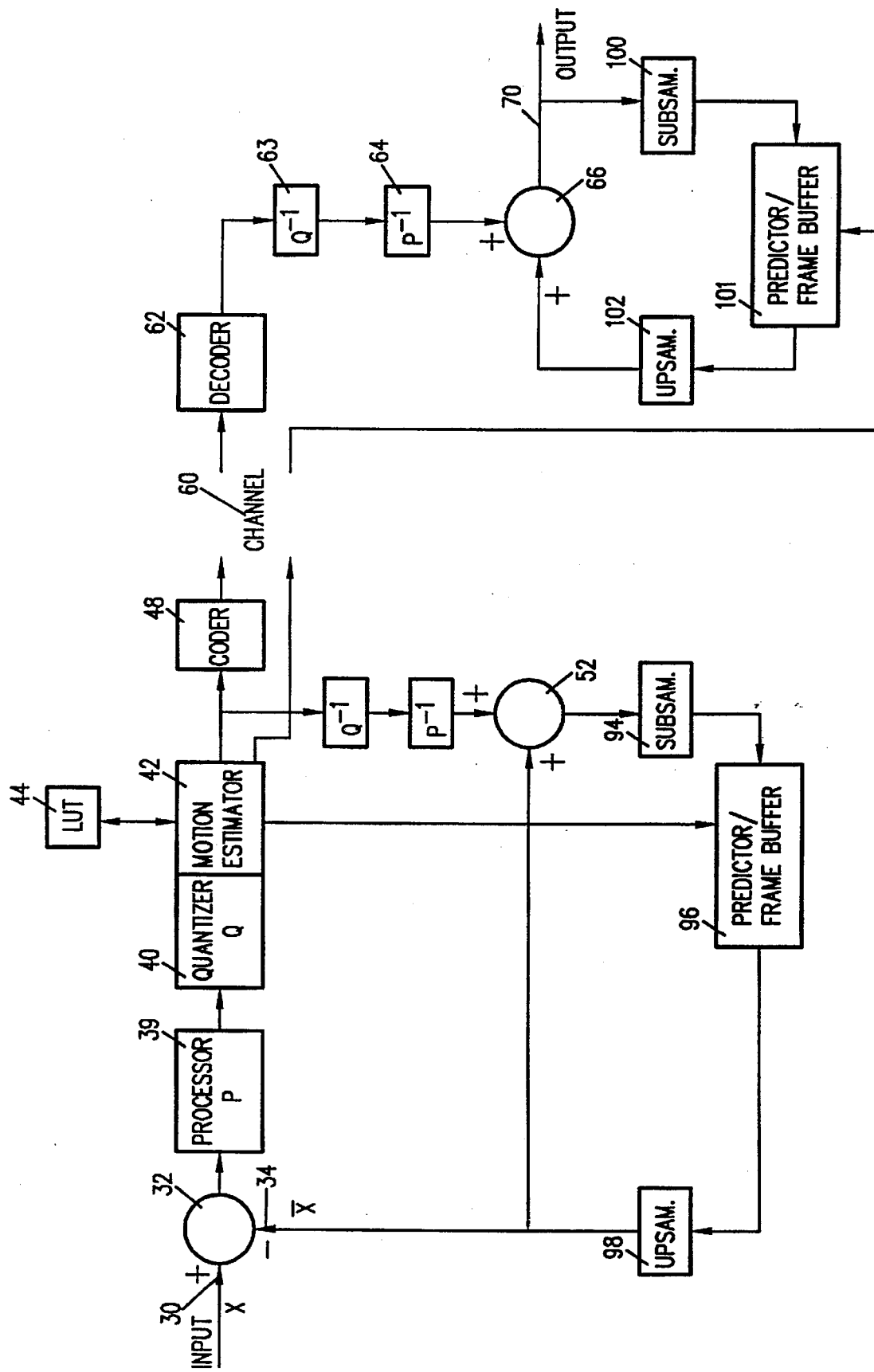
FIG. 5 is a block diagram of a preferred embodiment of the video coding/decoding system which uses a smaller predictor frame memory.

FIG. 5 illustrates a preferred embodiment of a video codec which includes a subsampler 94 connected to the input of a predictor 96. Predictor 96 has the same functions as the frame buffer 38 shown in FIG. 2. Subsampler 94 reduces the rate at which video data outputted by adder 52 is stored in predictor 96. This reduces the storage requirements and bandwidth requirements of predictor 96, thus reducing hardware costs. In one embodiment, subsampler 94 samples every other horizontal pel and every other row of pels to provide 4:1 sampling. Thus, the frame buffer in predictor 96 need be only one-fourth the size of frame buffer 38 in FIG. 2, resulting in considerable cost savings and reducing the size of the video codec.

An upsampler 98 is connected to the output of predictor 96 for generating interpolated data between the successive samples stored in predictor 96. The output of upsampler 98 will be similar to that outputted by frame buffer 38 in FIG. 2. No filtering is performed in the embodiment of FIG. 5.

The remainder of the circuit of FIG. 5 is identical to that of FIG. 2.

The receiver/decoder portion on the right side of FIG. 5 includes a similar subsampler 100, predictor 101, and upsampler 102. The remainder of the receiver/decoder is identical to that of FIG. 2.

The size of a block processed by the system of FIG. 5 would normally be 4×4, 8×8, 16×16, or 32×32 pels. In the following description of the subsampler and upsampler operations, the block size 8×8 is assumed. The invention can be applied to other sizes in a similar manner.

Since the blocks are individually written into the predictor frame buffer 96, the aliasing effects for the pels across the block boundaries cannot be reduced. Thus, no subsampling filtering is applied. This leads to a simple decimation operation performed in subsamplers 94 and 100 of FIG. 5. The subsampling operation is illustrated in FIG. 6, where pel values are located at the intersections of the two grids.

Figure 6:
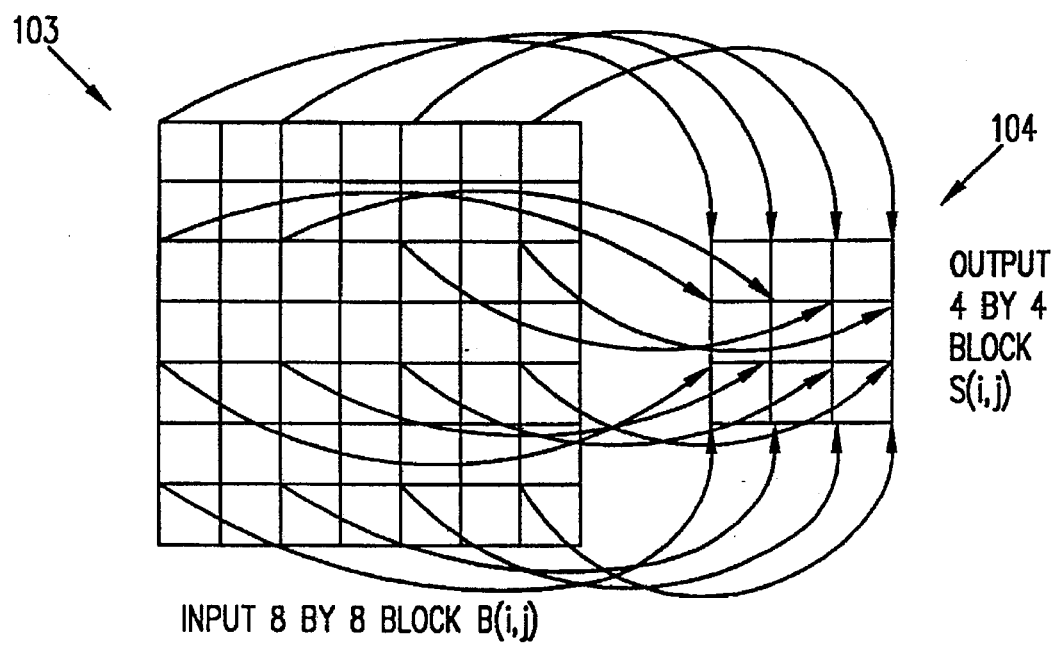
FIG. 6 illustrates the operation of the subsampler in FIG. 5.

In FIG. 6, if the input 8×8 block 103 to the subsampler 94 or 100 is denoted by $B(i,j)$ for $i,j=0, 1, \ldots 7$, where $i$ is the row and $j$ is the pixel along that row, then the output 4×4 block $S(i,j)=B(2i,2j)$ for $i,j=0, 1, 2, 3$. The 4×4 block is identified by numeral 104 in FIG. 6. This means that the subsampler 94 causes every other horizontal pel in every other row in the 8×8 block 103 to be stored in the frame buffer 96. Thus, the frame buffer 96 or 101 in FIG. 5 needs to be only one-fourth of the size of the conventional predictor frame buffer 38 or 67 in FIG. 2.

Figure 7A:
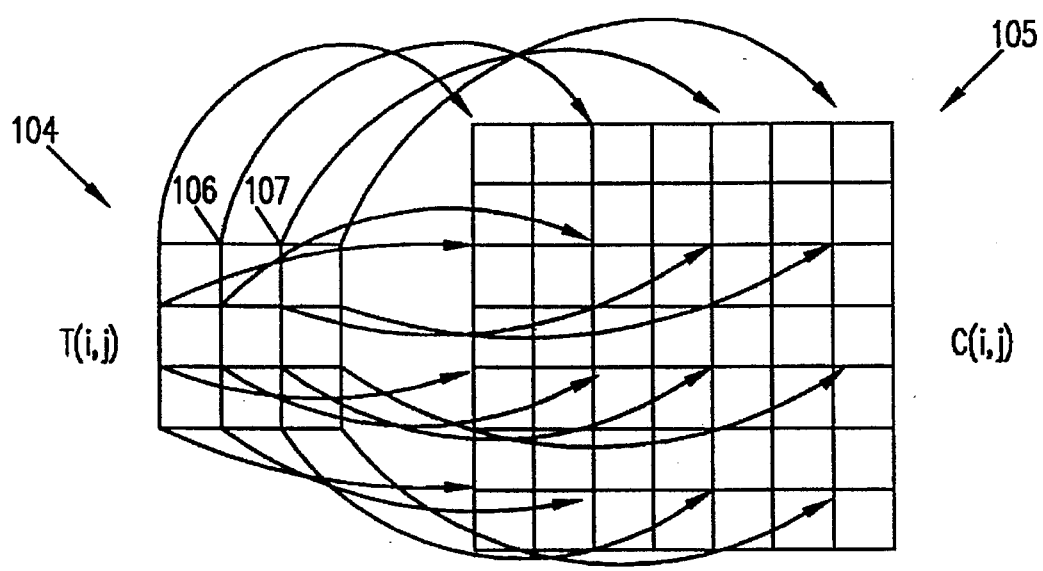
FIGS. 7A, 7B, 7C, 8A, and 8B illustrate the operation of the upsampler in FIG. 5.
Figure 7B:
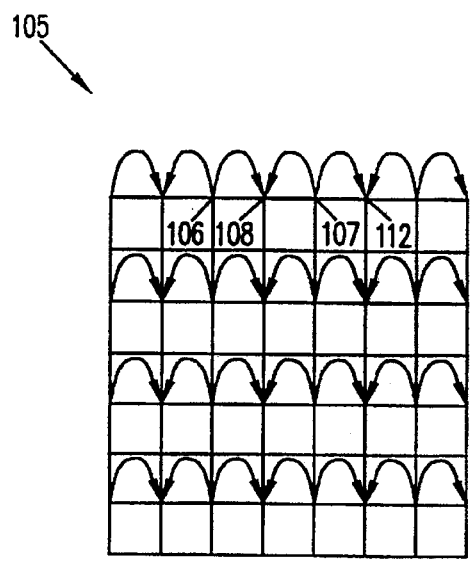
Figure 7C:
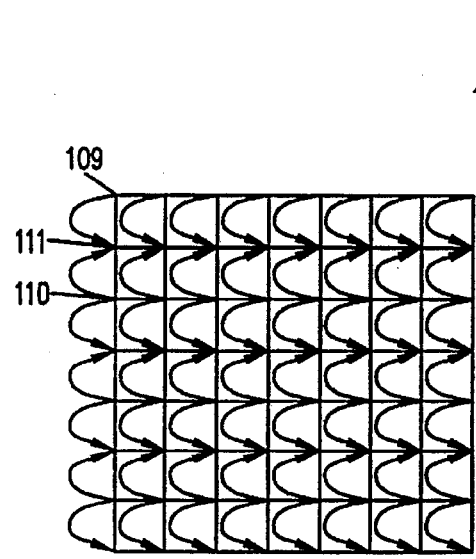

To obtain a predicted 8×8 block for application to subtractor 32 or adder 66 in FIG. 5, the upsampler 98 and 102 in the encoder or the decoder reads the corresponding 4×4 block 104 output from the predictor frame buffer 96 or 101 and performs a linear upsampling operation as illustrated by FIGS. 7A, 7B, and 7C. The linear upsampling operation of the upsampler 98 and 102 is performed in three steps.

In FIG. 7A, some of the pels in the 8×8 block 105 output by the upsampler are directly replaced with the corresponding pels of the 4×4 block 104 from the predictor frame buffer 96 or 101. More specifically, if the output 8×8 block 105 of the upsampler 98 or 102 is denoted by $C(i,j)$ for $i,j=0, 1, \ldots 7$, and the input 4×4 block 104 from the predictor frame buffer 96 or 101 is denoted as $T(i,j)$ for $i,j=0, 1, 2, 3$, then the step performed in FIG. 7A is to set $C(2i,2j)=T(i,j)$, for $i,j=0, 1, 2, 3$.

The second step performed by the upsampler 98 or 102 is shown in FIG. 7B. In step 7B, a linear interpolation in the horizontal direction is performed to fill in some of the missing pels of the output 8×8 block 105. In FIG. 7B, two facing pels (e.g., pels 106 and 107) in the output 4×4 block 104 (FIG. 7A) along a horizontal row are averaged together, and this average pel value is inserted (e.g., at 108) between the two facing pels. This is illustrated in FIG. 7B by arrows from two facing pels 106 and 107 merging into the averaged pel value inserted between the facing pels. Note how pels in the penultimate position in a row are simply replicated into the last position of the row. More specifically, $C(i,j)=[C(i,j-1)+C(i,j+1)]/2$, for $i=0, 2, 4, 6$ and $j=1, 3, 5$, and $C(i,7)=C(i,6)$ for $i=0, 2, 4, 6$.

The third step performed by the upsampler 98 or 102 is shown in FIG. 7C where the linear interpolations are then performed in the vertical direction to fill in the remaining missing pels of the output 8×8 block 105. As seen from FIG. 7C, facing pels (e.g., 109, 110) along the vertical direction are averaged together, and this average pel value is inserted (e.g., at 111) between the facing pels. Note how pels in the bottom row are simply replications of those pels from the penultimate row.

More specifically, $C(i,j)=[C(i-1,j)+C(i+1,j)]/2$, for $i=1, 3, 5$, and $j=0, 1, \ldots 7$, and $C(7,j)=C(6,j)$ for $j=0, 1, \ldots 7$.

Only the above-described linear interpolation (FIGS. 7B and 7C) is performed by the upsampler 98 or 102 on those blocks for which zero movement is detected. Zero movement is detected, as previously described, by the quantized difference signal being below a threshold value. When such zero movement is detected, the resulting 8×8 block 105 of pels output from upsampler 98 or 102 is applied to downstream circuitry as shown in FIG. 5.

Figure 8A:
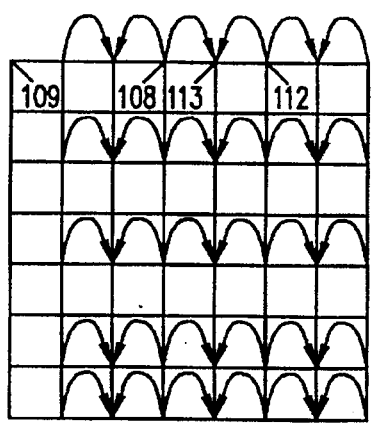
Figure 8B:
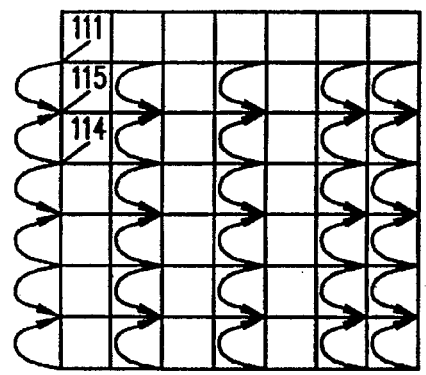

In addition to the linear upsampling operation described with respect to FIGS. 7A, 7B, and 7C, another operation by upsampler 98 or 102 is applied to blocks with non-zero motion, as illustrated in FIGS. 8A and 8B. The operation of FIGS. 8A and 8B provides a certain amount of filtering of the pel data output by the predictor frame buffer 96 or 101 and achieves the effect of loop filtering which is commonly used in conventional video codecs. The loop filtering helps avoid any visual artifacts arising from the block motion compensation process. This loop filtering operation of the upsampler 98 or 102 is performed in two steps.

The first step, illustrated in FIG. 8A, takes some of the pels (e.g., 106, 107 in FIG. 7A) which were directly copied from the 4×4 input block 104 and filters these pels in a horizontal direction. The previously averaged pel values (e.g., 108, 112) facing each other in the horizontal direction, calculated in FIG. 7B, are now averaged together to create new pel values, such as value 113. These new values (e.g. 113) then replace the original pel value (e.g., 107) between the two averaged pel values (e.g., 108, 112). The pel values (e.g., 109) in the left most pel position of a row are not used in this calculation. More specifically, $C(i,j)=[C(i,j-1)+2C(i,j)+C(i,j+1)]/4$, for $i=0, 2, 4, 6, 7$ and $j=2, 4, 6$.

The second step performed in the upsampler 98 or 102 for loop filtering is illustrated in FIG. 8B where some of the pels which were directly copied from the 4×4 input block 104 in FIG. 7A are filtered in the vertical direction. This is performed by averaging two pel values (e.g., 111, 114) along the vertical direction and replacing the middle original pel value (e.g., 110 in FIG. 7C) with this averaged pel value (e.g., at 115). More specifically, $C(i,j)=[C(i-1,j)+2C(i,j)+C(i+1,j)]/4$, for $i=2, 4, 6$ and $j=0, 2, 4, 6, 7$. The loop filtering of FIGS. 8A and 8B slightly blurs the block when movement is detected so that the boundaries between adjacent blocks will not be noticeable.

Figure 9:
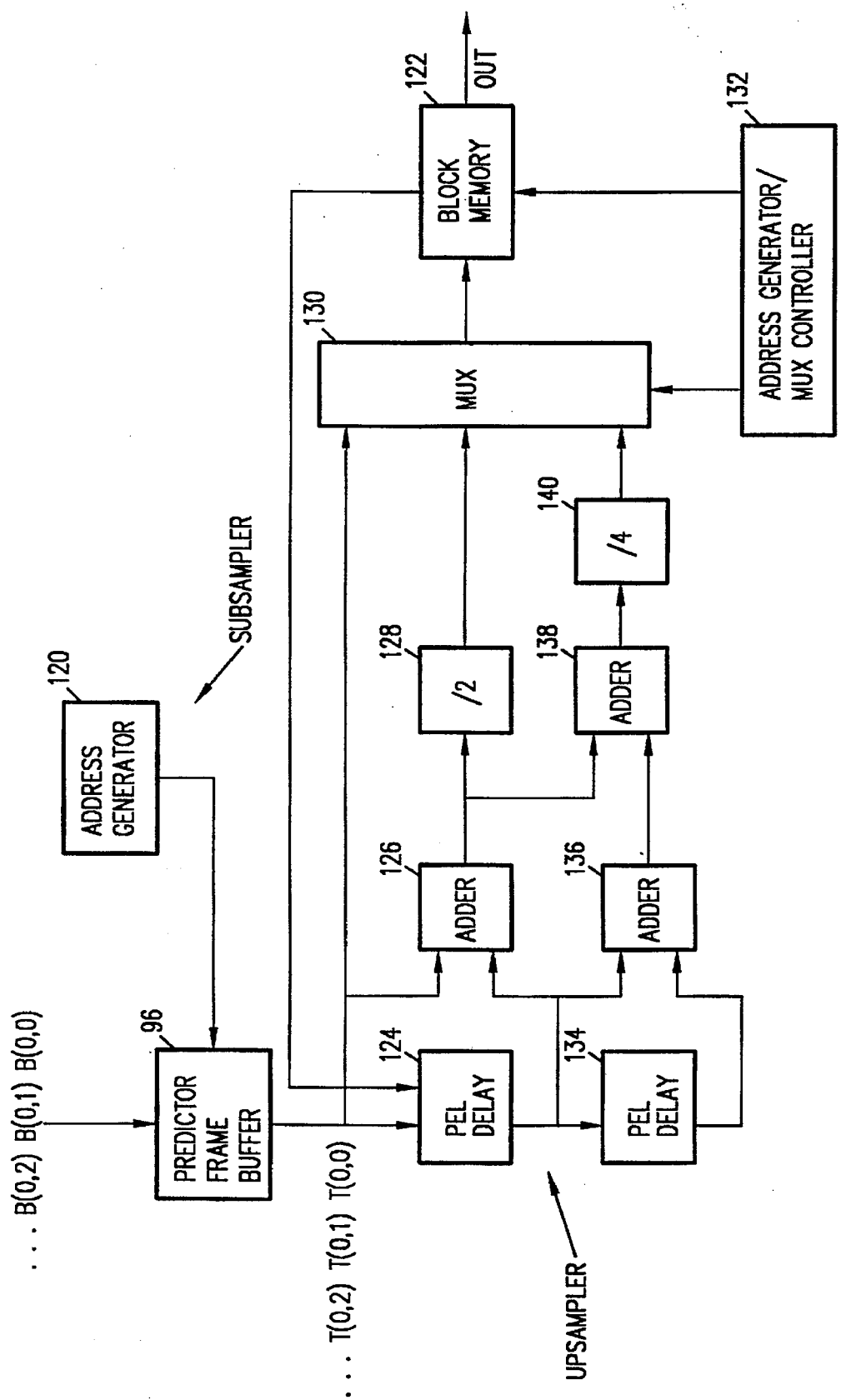
FIG. 9 is a block diagram of the subsampler and upsampler of FIG. 5.

The general structure of the subsampler 94/100 and upsampler 98/102 is shown in FIG. 9. The pels of the 8×8 input block (103 in FIG. 6) are received in the following order: B(0,0), B(0,1), B(0,2), ..., B(0,7), B(1,0), B(1, 1), ..., B(1,7), ..., B(7,0), B(7,1), ..., B(7,7).

Subsampler 94 or 100 is shown as address generator 120 in FIG. 9 where the address generator 120 generates sequential addresses and write-enable signals for the predictor frame buffer 96. At the start of block data writing, the address generator 120 generates the initial address for B(0, 0). Then the address generator 120 sequentially updates the address but only asserts the write-enable signal every other clock cycle. From B(1,0) to B(1,7), the address generator 120 does not assert write-enable. After B(1,7), the address generator 120 generates the initial address for B(2,0), and then asserts write-enable every other clock cycle. The above procedure is then repeated similarly for the rest of the pel rows shown in FIG. 7A.

For the upsampler 98 or 102, a dual port memory 122 of 8×8 size is needed, which can be the same on-chip memory for the transformation and quantization operations included in either the processor 39 or quantizer 40 in FIG. 5. The linear interpolation steps shown in FIGS. 7B and 7C are implemented using pel delay 124, adder 126, divide-by-half shifter 128, multiplexer 130, and the address generator/mux controller 132. For horizontal interpolation, adder 126 adds a present pel value from the predictor frame buffer 96 and a previous pel value outputted by pel delay 124. The divide-by-two shifter 128 then takes an average of these two pel values and applies this average to multiplexer 130. Multiplexer 130 is controlled by controller 132 to alternately store the pel value from the predictor frame buffer 96 followed by the averaged pel value as shown in FIG. 7B.

For the vertical interpolation shown in FIG. 7C, the pel values now stored in block memory 122 are then applied to the input of the pel delay 124 in a vertical raster scan order. The pel values are now interpolated vertically as shown in FIG. 7C.

The loop filtering is performed by pel delay 134, adder 136, adder 138, and divide-by-four shifter 140, in conjunction with the remainder of the circuit, if movement of a block of pels is detected.

The loop filtering for the horizontal pels in a row, shown in FIG. 8A, is performed before the loop filtering in the vertical direction, shown in FIG. 8B. The divide-by-four shifter 140 outputs those filtered pel values indicated by the merging arrows in FIGS. 8A and 8B. One skilled in the art would readily understand the operation of the circuit of FIG. 9 and the various components necessary to implement this circuit.

Other implementations for subsampling and upsampling of data may also be used.

The various circuits and algorithms for carrying out all the remaining embodiments of FIGS. 2 and 4-9 would be readily understood by those skilled in the art.

When compressing/decompressing color video signals, the RGB or YUV (or other format) signals may be processed separately using the same codec or may be processed in parallel, which would be readily understood by those skilled in the art.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for generating compressed video data, said method comprising the steps of:

receiving first video data at one or more input terminals representing a first block of M×N picture elements (pels) from a first frame of Q×R pels;

subsampling second video data representing a second block of M×N pels, by outputting only selected subsampled video data from said second block, so as to reduce said second block to a subsampled block of S×T pels;

storing in a memory said subsampled block representing S×T pels;

addressing said memory to output said subsampled block representing S×T pels;

upsampling said subsampled block output from said memory, by interpolating pel values, to output an upsampled block of M×N pels;

generating a difference signal representing differences between said first block of pels from said first frame and said upsampled block;

transmitting a signal corresponding to said difference signal to a receiver;

adding said difference signal to said upsampled block to form an input block of video data for subsampling;

repeating said steps of receiving, subsampling, storing, addressing, upsampling, generating, transmitting, and adding for a plurality of blocks of M×N pels applied to said one or more input terminals until all video data in said first frame has been received and difference signals for said first frame have been generated;

motion compensating said subsampled block output from said memory if it is determined in said step of generating a difference signal that movement has occurred between a previous frame and said first frame;

detecting a number of bits required to be transmitted in order to convey said difference signal;

selecting for motion compensation of said subsampled block from said memory a motion vector which produces a fewest number of bits required to be transmitted to convey said difference signal; and transmitting said motion vector and said difference signal which resulted in said fewest number of bits required to convey said difference signal.

2. A method of claim 1 wherein said subsampling comprises performing 4 to 1 subsampling of said second video data such that a representation of said first frame is stored in said memory using one-fourth of the pels in said first frame.

3. A method of claim 1 wherein said subsampling comprises performing 9 to 1 subsampling of said second video data such that a representation of said first frame is stored in said memory using one-ninth of the pels in said first frame.

4. A method of claim 1 wherein said subsampling comprises performing 16 to 1 subsampling of said second video data such that a representation of said first frame is stored in said memory using one-sixteenth of the pels in said first frame.

5. The method of claim 1 wherein said subsampling is performing by controlling a write-enable signal for said memory while also addressing said memory so as to store only selected subsampled video data in said memory.

6. The method of claim 1 wherein said memory is approximately one-quarter the size of a memory required to store a full first frame.

7. The method of claim 1 wherein said upsampling averages selected pel values together to created interpolated pels for said upsampled block.

8. The method of claim 1 wherein said upsampling comprises a first upsampling process for upsampling said subsampled block of S×T pels when no movement of said block is detected between said first frame and a previous frame, and performs an additional second upsampling process for low pass filtering of said subsampled block when it is detected that there has been movement of said block between said first frame and said previous frame.

9. The method of claim 8 wherein said low pass filtering performs additional averaging of pel values over that performed during said first upsampling process.

10. The method of claim 1 further comprising the step of transmitting a signal indicating that no movement of said first block contained in said first frame has occurred between said previous frame and said first frame if, in said step of generating a difference signal, a determination is made that no movement has occurred.

11. The method of claim 10 wherein said difference signal addresses a look-up table which cross-references said difference signal to the number of bits required to be transmitted in order to convey said difference signal.

12. The method of claim 11 wherein said look-up table cross-references said difference signal with the anticipated output of a coder which converts a difference signal into a variable-length bit stream.

13. The method of claim 1 wherein said steps of generating a difference signal, motion compensating said subsampled block, and detecting a number of bits are repeated for different motion compensations of said subsampled block from said memory to identify a particular motion vector in said step of selecting which resulted in said fewest number of bits to convey said difference signal.

* * * * *